US009552028B2

United States Patent
Wu

(10) Patent No.: US 9,552,028 B2
(45) Date of Patent: Jan. 24, 2017

(54) PORTABLE ELECTRONIC DEVICE AND VOLTAGE CONVERTING CIRCUIT THEREOF

(71) Applicant: Hai-Zhou Wu, Shenzhen (CN)

(72) Inventor: Hai-Zhou Wu, Shenzhen (CN)

(73) Assignees: SHENZHEN FUTAIHONG PRECISION INDUSTRY CO., LTD., Shenzhen (CN); Chi Mei Communication Systems, Inc., New Taipei (TW)

( * ) Notice: Subject to any disclaimer, the term of this patent is extended or adjusted under 35 U.S.C. 154(b) by 999 days.

(21) Appl. No.: 13/655,404

(22) Filed: Oct. 18, 2012

(65) Prior Publication Data

US 2013/0169043 A1    Jul. 4, 2013

(51) Int. Cl.
| | | |
|---|---|---|
| *H02J 1/10* | (2006.01) | |
| *H02J 3/38* | (2006.01) | |
| *H02J 7/34* | (2006.01) | |
| *G06F 1/26* | (2006.01) | |

(52) U.S. Cl.
CPC .............. *G06F 1/26* (2013.01); *Y10T 307/305* (2015.04)

(58) Field of Classification Search
USPC .............................................. 307/18; 381/74
See application file for complete search history.

(56) References Cited

U.S. PATENT DOCUMENTS

| | | | | |
|---|---|---|---|---|
| 4,771,399 A * | 9/1988 | Snowden | ............... | G11C 16/30 340/7.32 |
| 6,348,744 B1 * | 2/2002 | Levesque | .............. | H02J 7/0065 307/64 |
| 8,321,694 B2 * | 11/2012 | Hu | ............................ | G06F 1/26 323/280 |
| 2007/0123304 A1 * | 5/2007 | Pattenden | ................. | G06F 1/26 455/557 |
| 2009/0182218 A1 * | 7/2009 | Lee | .......................... | A61B 5/05 600/407 |
| 2011/0001454 A1 * | 1/2011 | Kano | ...................... | G06F 1/266 320/107 |
| 2011/0137563 A1 * | 6/2011 | Williams | ............. | G01D 18/002 702/2 |
| 2013/0033233 A1 * | 2/2013 | Noda | .................... | H01M 10/44 320/134 |

* cited by examiner

*Primary Examiner* — Rexford Barnie
*Assistant Examiner* — Xuan Ly
(74) *Attorney, Agent, or Firm* — Zhigang Ma

(57) ABSTRACT

A portable electronic device includes a battery, a central processing unit (CPU), and voltage converting circuit. The battery includes an erasable programmable read-only memory (EPROM) and a signal terminal connected to the EPROM. The CPU includes a read/write control terminal. The voltage converting circuit includes a first power terminal connected to a first power supply, a second power terminal connected to a second power supply, a first port connected to the read/write control terminal through a 1-wire bus, and a second port connected to the signal terminal.

16 Claims, 3 Drawing Sheets

PORTABLE ELECTRONIC DEVICE AND VOLTAGE CONVERTING CIRCUIT THEREOF

BACKGROUND

1. Technical Field

The disclosure generally relates to a portable electronic device and a voltage converting circuit of the portable electronic device.

2. Description of the Related Art

Compared with a typical battery outputting a voltage about 4.2V (volts), a high voltage battery has a capacity to increase its voltage output of about 4.35V by 20%-30%, which can improve standby performance of an electronic device, such as a mobile phone or a personal digital assistant, for example.

To identify itself as not being a typical battery, the high voltage battery generally includes an erasable programmable read-only memory (EPROM). Thus, when the high voltage battery is secured within the electronic device, a central processing unit (CPU) inside of the electronic device can identify a type of the battery by reading information from the EPROM. However, working voltages of the EPROM and the CPU are respectively equal to 2.8V and 1.8V, which can lead to a disordered communication between the EPROM and the CPU so that the CPU cannot read or reads information of the EPROM erroneously, thereby affecting a compatibility of the high voltage battery.

Therefore, there is room for improvement within the art.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
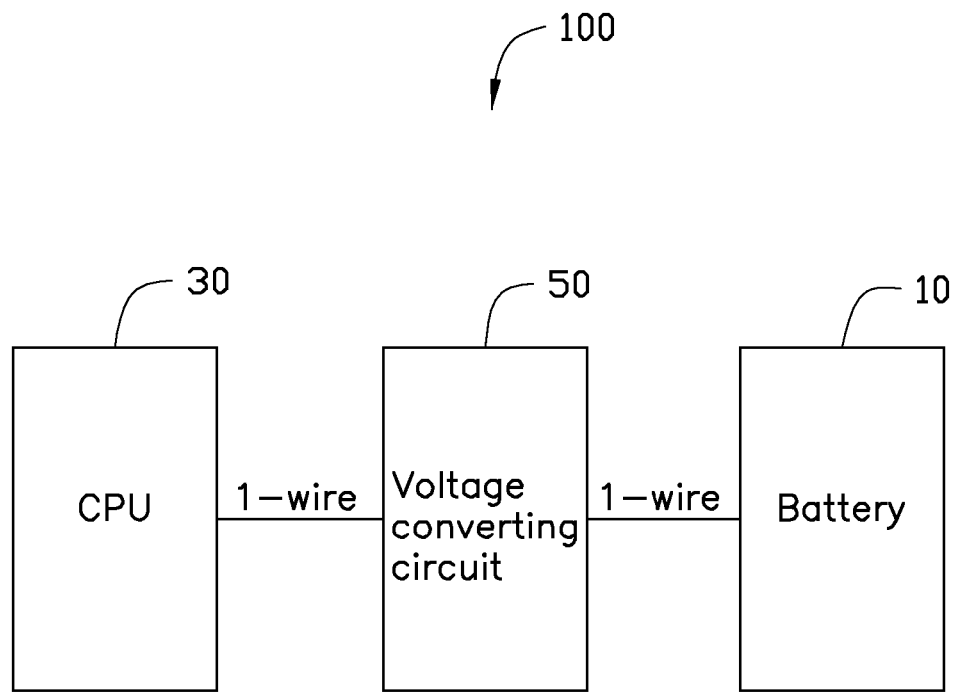
FIG. 1 is a block diagram of a portable electronic device, according to an exemplary embodiment.
Figure 2:
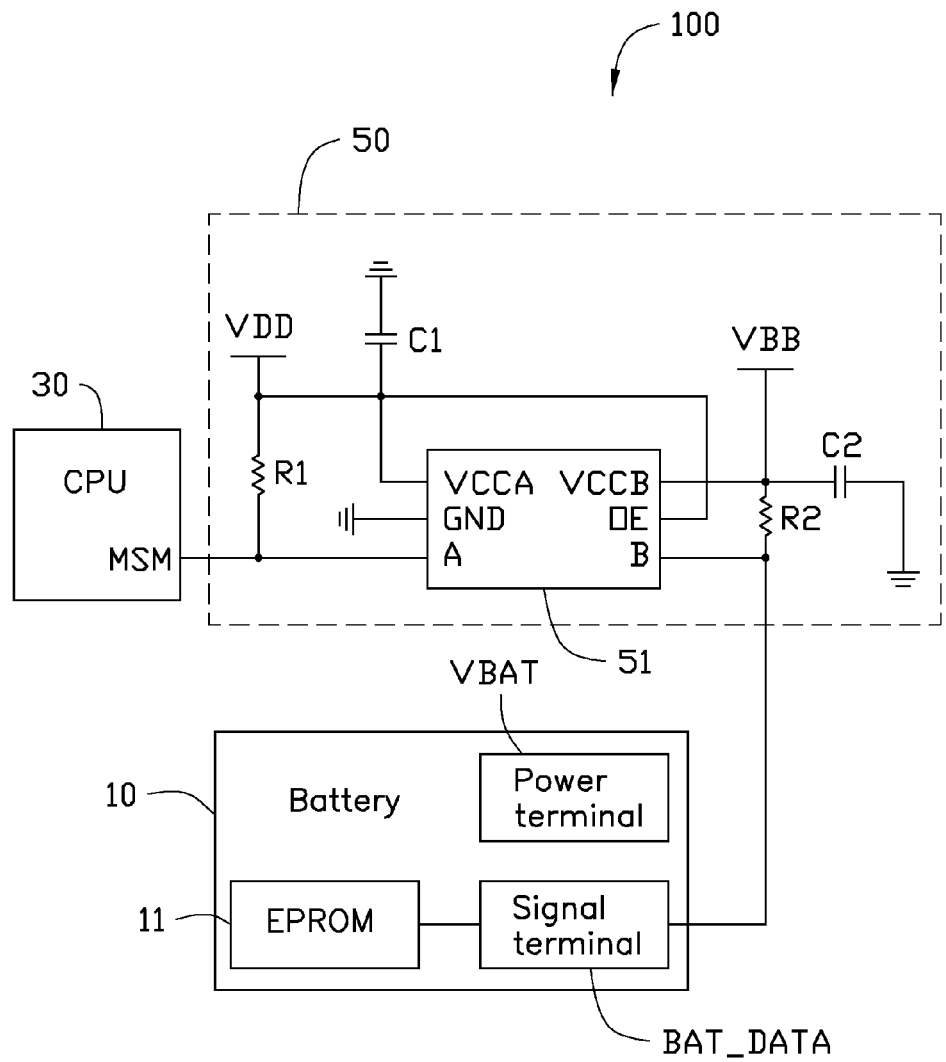
FIG. 2 is a circuit diagram of the portable electronic device of FIG. 1.

Referring to FIGS. 1 and 2, an embodiment of a portable electronic device 100 is shown. The portable electronic device 100 includes a battery 10, a central processing unit (CPU) 30, and a voltage converting circuit 50. The battery 10 provides power to the portable electronic device 100. The battery 10 includes an erasable programmable read-only memory (EPROM) 11. The voltage converting circuit 50 is connected between the battery 10 and the CPU 30. Working voltages of the EPROM 11 and the CPU 30 are compatible with each other by the voltage converting circuit 50 so the CPU 30 can execute a read/write operation to the EPROM 11 through the voltage converting circuit 50.

The battery 10 further includes a power terminal VBAT and a signal terminal BAT_DATA. The power terminal VBAT outputs a standard voltage about 4.35 V (volts) to provide power to the portable electronic device 100. The signal terminal BAT_DATA is electronically connected to the EPROM 11 and to the voltage converting circuit 50.

The CPU 30 includes a read/write control terminal MSM. The read/write control terminal MSM is electronically connected to the voltage converting circuit 50.

The voltage converting circuit 50 includes a voltage converting chip 51. In one embodiment, the voltage converting chip 51 can be a TXS010DCKR bidirectional voltage-level translator. The voltage converting chip 51 includes a first power terminal VCCA, a second power terminal VCCB, a grounding terminal GND, an output enable terminal OE, a first port A, and a second port B. The first power terminal VCCA is connected to a first power supply VDD, and is also connected to ground via a capacitor C1. The second power terminal VCCB is connected to a second power supply VBB, and is also connected to ground via a capacitor C2. In one embodiment, the first power supply VDD can be integrated with a system power of the portable electronic device 100 that provides a first voltage about equal to a working voltage of the CPU 30 (i.e., 1.8V) to the first power terminal VCCA. Similarly, the second power supply VBB can be integrated with a power supply of the EPROM 11 that provides a second voltage about equal to a working voltage of the EPROM 11 (i.e., 2.8V) to the second power terminal VCCB. The grounding terminal GND is connected to ground. The output enable terminal OE is electronically connected to the first power supply VDD, thus the voltage converting chip 51 is always in a working state.

The first port A is connected to the read/write control terminal MSM through a 1-wire bus. The second port B is connected to the signal terminal BAT_DATA through a 1-wire bus. In this way, the CPU 30 is connected to the battery 10 through the signal converting circuit 50, thereby establishing an electronic connection with the EPROM 11 of the battery 10 and communicating with the EPROM 11 through a 1-wire protocol, e.g., executing a read/write operation.

Furthermore, the first port A is connected to the first power supply VDD through a first pull-up resistor R1, and the second port B is connected to the second power supply VBB through a second pull-up resistor R2.

Figure 3:
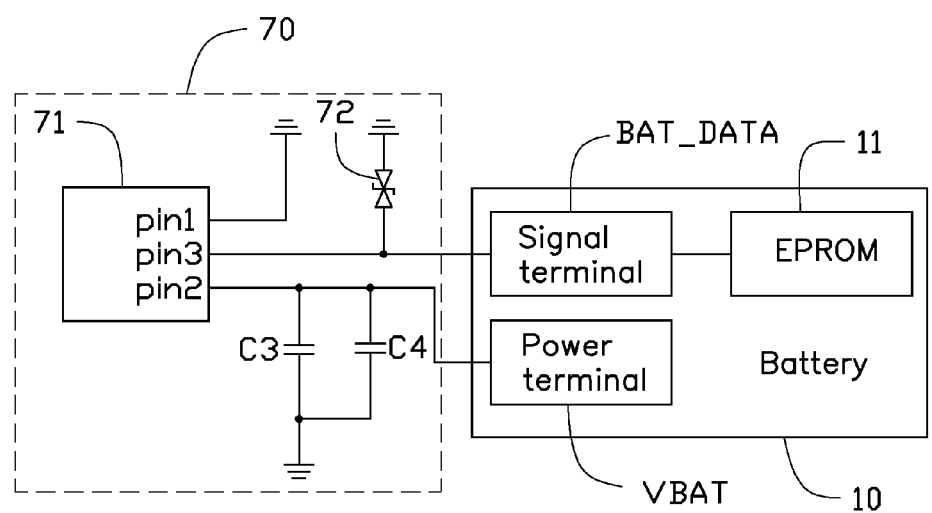
FIG. 3 is a circuit diagram of a supply circuit of the portable electronic device shown in FIG. 1.

Referring to FIG. 3, in other embodiments, the portable electronic device 100 further includes a power supply circuit 70. The power supply circuit 70 includes a battery base 71. The battery 10 can be secured in the battery base 71, and be electronically connected to the portable electronic device 100 through the battery base 71. In detail, the battery base 71 includes a grounding pin pin1, a power pin pin2, and a signal pin pin3. The grounding pin pin1 is connected to ground. The power pin pin2 is connected to a power contact within a battery receiving space (not shown) of the portable electronic device 100, and also connected to the power terminal VBAT. In this way, the battery 10 can provide power to the portable electronic device 100 through the power terminal VBAT and the power pin pin2. The signal pin pin3 is connected to a signal contact within the battery receiving space of the portable electronic device 100, and is also connected to the signal terminal BAT_DATA. In this way, the EPROM 11 can connect to a circuit board (not shown) of the portable electronic device 100 through the signal terminal BAT_DATA and the signal pin pin3, to simulate a working state of the battery 10.

In other embodiments, the power terminal VBAT is connected to ground through a group of capacitors C3, C4 connected in parallel. The group of capacitors C3, C4 filter a voltage from the battery 10 and output the filtered voltage to the portable electronic device 100.

In other embodiments, the signal terminal BAT_DATA is further connected to ground through a transient voltage suppressor (TVS) 72. The TVS 72 is used to dispel static or other transients of a signal output to the portable electronic device 100.

In use, the battery 10 is secured in the battery base 71 to provide power to the portable electronic device 100. When the CPU 30 executes a read operation to the EPROM 11 through the 1-wire bus under the 1-wire protocol, the voltage converting chip 51 converts a voltage of a signal output by the signal terminal BAT_DATA (i.e., a voltage of about 2.8V) into a voltage that can be identified by the CPU 30 (i.e., a voltage of about 1.8V). When the CPU 30 executes a write operation to the EPROM 11 through the 1-wire bus under the 1-wire protocol, the voltage converting chip 51 converts a voltage of a signal output by the CPU 30 (i.e., a voltage of about 1.8V) into a voltage that can be identified by the EPROM 11 (i.e., a voltage of about 2.8V).

Accordingly, by means of setting up the voltage converting circuit 50, a working voltage of the battery 10 can be compatible with a working voltage of the CPU 30. Thus, the CPU 30 can execute a read or a write operation to the battery 10 to enhance compatibility of the battery 10.

In the present specification and claims, the word "a" or "an" preceding an element does not exclude the presence of a plurality of such elements. Further, the word "comprising" does not exclude the presence of elements or steps other than those listed.

It is to be also understood that even though numerous characteristics and advantages of exemplary embodiments have been set forth in the foregoing description, together with details of the structures and functions of the embodiments, the disclosure is illustrative only, and changes may be made in detail, especially in the matter of arrangement of parts within the principles of this disclosure to the full extent indicated by the broad general meaning of the terms in which the appended claims are expressed.

What is claimed is:

1. A voltage converting circuit, comprising:
    a voltage converting chip comprising:
        a first port connected to a read/write control terminal of a central processing unit (CPU) through a 1-wire bus;
        a second port connected to a signal terminal of a battery through a 1-wire bus, the battery comprising an erasable programmable read-only memory (EPROM) connected to the signal terminal of the battery;
        a first power terminal connected to a first power supply that provides a first voltage about equal to a working voltage of the CPU;
        a second power terminal connected to a second power supply that provides a second voltage about equal to a working voltage of the EPROM; and
        an output enable terminal electronically connected to the first power supply, so that the voltage converting chip is always in a working state;
    wherein when the CPU executes a read operation to the EPROM, the voltage converting chip converts a voltage of a signal output by the signal terminal into a voltage that can be identified by the CPU, and when the CPU executes a write operation to the EPROM, the voltage converting chip converts a voltage of a signal output by the CPU into a voltage that can be identified by the EPROM.

2. The voltage converting circuit of claim 1, wherein the first power supply is integrated with a system power that provides the first voltage to the first power terminal.

3. The voltage converting circuit of claim 1, wherein the second power supply is integrated with a power supply of the EPROM that provides the second voltage to the second power terminal.

4. The voltage converting circuit of claim 1, wherein the first port is connected to the first power supply through a first pull-up resistor.

5. The voltage converting circuit of claim 1, wherein the second port is connected to the second power supply through a second pull-up resistor.

6. A portable electronic device, comprising:
    a battery comprising an erasable programmable read-only memory (EPROM) and a signal terminal connected to the EPROM;
    a central processing unit (CPU) comprising a read/write control terminal; and
    a voltage converting circuit, comprising:
        a voltage converting chip comprising:
            a first port connected to the read/write control terminal through a 1-wire bus;
            a second port connected to the signal terminal through a 1-wire bus;
            a first power terminal connected to a first power supply that provides a first voltage about equal to a working voltage of the CPU;
            a second power terminal connected to a second power supply that provides a second voltage about equal to a working voltage of the EPROM; and
            an output enable terminal electronically connected to the first power supply, so that the voltage converting chip is always in a working state;
        wherein when the CPU execute a read operation to the EPROM, the voltage converting circuit converts a voltage of a signal output by the EPROM into a voltage that can be identified by the CPU; when the CPU execute a write operation to the EPROM, the voltage converting circuit converts a voltage of a signal output by the CPU into a voltage that can be identified by the EPROM.

7. The portable electronic device of claim 6, wherein the first power supply is integrated with a system power of the portable electronic device which provides the first voltage to the first power terminal.

8. The portable electronic device of claim 6, wherein the second power supply is integrated with a power supply of the EPROM which provides the second voltage to the second power terminal.

9. The portable electronic device of claim 6, wherein the first port is connected to the first power supply through a first pull-up resistor.

10. The portable electronic device of claim 6, wherein the second port is connected to the second power supply through a second pull-up resistor.

11. The portable electronic device of claim 6, wherein the signal terminal is connected to ground through a transient voltage suppressor.

12. The portable electronic device of claim 6, wherein the battery comprises a power terminal providing power to the portable electronic device.

13. The portable electronic device of claim 12, wherein the power terminal is connected to ground through a group of capacitors connected in parallel.

14. The portable electronic device of claim 12, further comprising a power supply circuit, wherein the power supply circuit comprises a battery base received the battery.

15. The portable electronic device of claim 14, wherein the battery base comprises a power pin; the power pin is connected to a power contact within a battery receiving space of the portable electronic device and is also connected to the power terminal of the battery.

16. The portable electronic device of claim 14, wherein the battery base comprises a signal pin; the signal pin is connected to a signal contact within a battery receiving space of the portable electronic device and is also connected to the signal terminal of the battery.

* * * * *